US007221779B2

(12) United States Patent
Kawakami et al.

(10) Patent No.: US 7,221,779 B2
(45) Date of Patent: May 22, 2007

(54) OBJECT MEASURING APPARATUS, OBJECT MEASURING METHOD, AND PROGRAM PRODUCT

(75) Inventors: Yuichi Kawakami, Nishinomiya (JP); Yuusuke Nakano, Akashi (JP)

(73) Assignee: Konica Minolta Holdings, Inc., Tokyo (JP)

( * ) Notice: Subject to any disclaimer, the term of this patent is extended or adjusted under 35 U.S.C. 154(b) by 393 days.

(21) Appl. No.: 10/953,976

(22) Filed: Sep. 29, 2004

(65) Prior Publication Data

US 2005/0084133 A1 Apr. 21, 2005

(30) Foreign Application Priority Data

Oct. 21, 2003 (JP) ........................... P2003-360580

(51) Int. Cl.
*G06K 9/03* (2006.01)
*H04N 9/24* (2006.01)
*G02B 9/02* (2006.01)

(52) U.S. Cl. ...................... 382/107; 382/103; 348/699; 348/152; 348/155

(58) Field of Classification Search ................ 382/103, 382/107; 348/699, 152, 155
See application file for complete search history.

(56) References Cited

FOREIGN PATENT DOCUMENTS

JP 2002-008018 A 1/2002

OTHER PUBLICATIONS

Erdem, C.E. et al., "Metrics for performance evaluation of video object segmentation and tracking without ground-truth", Oct. 7-10, 2001, Image Processing, 2001. Proceedings. 2001 International Conference, vol. 2, pp. 69-72.*

"Tracking a Person with 3-D Motion by Integrating Optical Flow and Depth", by R. Okada, Y. Shirai, and J. Miura, Proc. 4th Int. Conf. on Automatic Face and Gesture Recognition, pp. 336-341, Mar. 2000.

* cited by examiner

*Primary Examiner*—Jeffrey Stucker
*Assistant Examiner*—John W. Lee
(74) *Attorney, Agent, or Firm*—Sidley Austin LLP

(57) ABSTRACT

The present invention provides an object measuring apparatus capable of performing high-speed process and accurately counting the number of a plurality of objects even in the case where the plurality of objects pass a boundary line simultaneously. The object measuring apparatus extracts motion vectors at a plurality of times in each of a plurality of positions on a boundary line on the basis of a plurality of images. The object measuring apparatus obtains at least one integral value by integrating components perpendicular to the boundary line of the motion vectors. As the at least one integral value, for example, an integral value derived by integrating the perpendicular components of one of positive and negative signs is obtained. The object measuring apparatus calculates the number of moving objects (people and the like) passing the boundary line on the basis of the integral value.

16 Claims, 12 Drawing Sheets

| | | |
|---|---|---|
| 0 | 1 | 0 |
| 1 | -4 | 1 |
| 0 | 1 | 0 |

OBJECT MEASURING APPARATUS, OBJECT MEASURING METHOD, AND PROGRAM PRODUCT

This application is based on application No. 2003-360580 filed in Japan, the contents of which are hereby incorporated by reference.

BACKGROUND OF THE INVENTION

1. Field of the Invention

The present invention relates to an object measuring apparatus for performing a process of counting the number of moving objects, and techniques related thereto.

2. Description of the Background Art

There are techniques of using an optical flow in order to measure movement of a moving object (for example, see "Tracking a Person with 3-D Motion by Integrating Optical Flow and Depth", by R. Okada, Y. Shirai, and J. Miura, Proc. 4th Int. Conf. on Automatic Face and Gesture Recognition, pp. 336-341, March, 2000 (Non-Patent Document 1) and Japanese Patent Application Laid-Open No. 2002-8018 (Patent Document 1)). The optical flow denotes a "vector field" constructed by "motion vectors" of corresponding pixels in two images.

In such techniques, a camera is located at a predetermined position and an optical flow is obtained from a motion image captured by the camera. For example, by obtaining motion vectors in a plurality of positions (detection points) in a two-dimensional region, an optical flow is obtained. By using the obtained optical flow, a moving object is detected and tracked.

With the techniques employed, in accordance with whether a tracked object passes a boundary line or not, the number of objects passing the boundary line can be counted.

However, in the case of employing the technique disclosed in Non-Patent Document 1 (also referred to as "first conventional art") in the above-described techniques, it is necessary to obtain a large number of motion vectors in a plurality of positions (detection points) in a two-dimensional region. It causes problems of a heavy processing load and long calculation time.

To address such a problem, Patent Document 1 discloses a technique of measuring the number of passages of moving objects not by obtaining motion vectors in a plurality of detection points provided in a two-dimensional region but by using motion vectors in a relatively small number of detection points provided in a one-dimensional direction (also referred to as "second conventional art"). More specifically, about 40 to 80 detection points are disposed in a one-dimensional direction of an approach position of a moving object, and motion vectors are detected with respect to the detection points. A time point when the total number of detection points at each of which a motion vector that is not zero (zero vector) is detected among the detection points becomes a threshold value or more is regarded as a time point when the head of a moving object passes, and a time point when the total number of similar detection points becomes a threshold value or less is regarded as a time point when the end of the moving object passes, thereby measuring a physical amount of the moving object. According to such a technique, as compared with the case of obtaining motion vectors in a number of detection points in a two-dimensional region, by decreasing the number of detection points, processing speed can be improved.

However, the technique of Patent Document 1 (second conventional art) has a problem in that the number of passages of moving objects is erroneously counted in the case where a plurality of moving objects pass a boundary line simultaneously. A situation is assumed that while a moving object (the first moving object) passes a boundary line, another moving object (the second moving object) reaches the boundary line. In this situation, when the second conventional art is employed, the total number of detection points in each of which a motion vector which is not zero is detected regarding the second moving object increases to a threshold or more before the total number of similar detection points regarding the first moving object decreases to the threshold or less. Consequently, there is a case that two moving objects cannot be counted separately.

SUMMARY OF THE INVENTION

The present invention aims to provide an object measuring system capable of performing high speed process and accurately counting the number of a plurality of objects even in the case where the plurality of objects pass a boundary line simultaneously.

In order to achieve the aim, according to a first aspect of the present invention, an object measuring system comprises: an extractor for extracting motion vectors at a plurality of times in each of a plurality of positions on the boundary line on the basis of a plurality of images; an integrator for obtaining at least one integral value derived by integrating perpendicular components perpendicular to the boundary line of the motion vectors, the at least one integral value being derived by integrating the perpendicular components of one of positive and negative signs; and a calculator for calculating the number of moving objects passing the boundary line on the basis of the at least one integral value.

According to the object measuring system, it is sufficient to obtain motion vectors on a boundary line; therefore, it is unnecessary to calculate an optical flow with respect to a wide two-dimensional region. Accordingly, processing load can be lessened and higher processing speed can be achieved. At least one integral value is obtained by integrating components perpendicular to the boundary line of the motion vector with respect to one of positive and negative signs and the number of moving objects is calculated on the basis of the integral value. Consequently, even in the case where a plurality of moving objects pass the boundary line in opposite directions at the same time, erroneous counting can be prevented and the number of passing objects can be measured accurately. As described above, the number of moving objects passing the boundary line can be calculated accurately at high speed.

According to a second aspect of the present invention, an object measuring system comprises: an extractor for extracting motion vectors at a plurality of times in each of a plurality of positions on the boundary line on the basis of a plurality of images; an integrator for obtaining an integral value by integrating components perpendicular to the boundary line of the motion vector; and a calculator for calculating the number of moving objects passing the boundary line on the basis of the at least one integral value and a reference value regarding the integral value.

According to the object measuring system, it is sufficient to obtain motion vectors on a boundary line; therefore, it is unnecessary to calculate an optical flow with respect to a wide two-dimensional region. Accordingly, processing load can be lessened and higher processing speed can be achieved. Further, since the number of moving objects passing the boundary line is obtained on the basis of an integral value derived by integrating components perpendicular to the boundary line of the motion vector and a reference value regarding the integral value, even in the case where a plurality of moving objects pass the boundary line at the same time, erroneous counting can be prevented and the number of passing objects can be measured accurately.

The present invention is also directed to an object measuring method and a program product.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

Configuration

Figure 1:
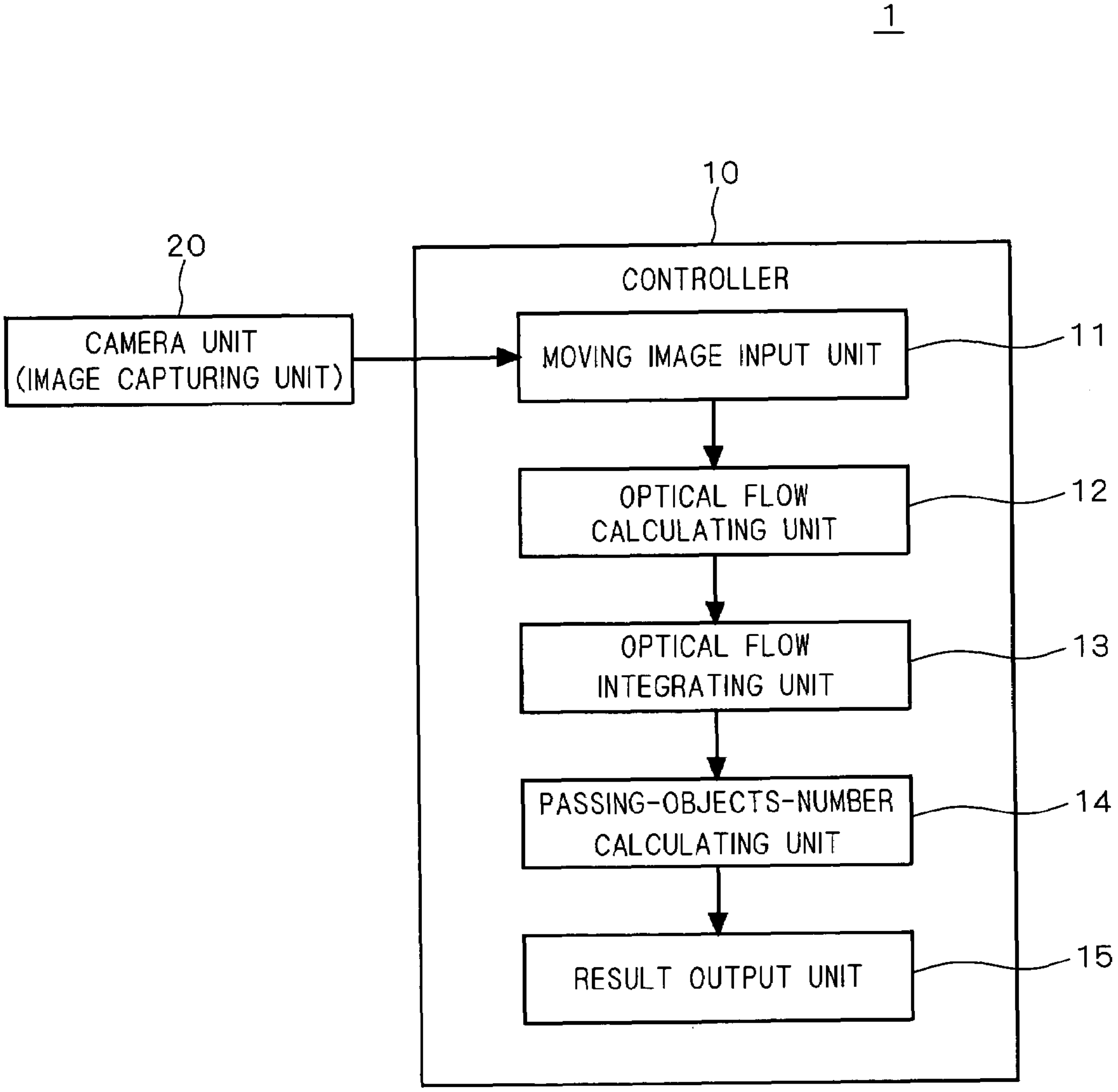
FIG. 1 is a diagram showing an object measuring apparatus.

FIG. 1 is a diagram showing an object measuring apparatus 1 according to an embodiment of the present invention. As shown in FIG. 1, the object measuring apparatus 1 comprises a controller 10 and a camera unit (image capturing unit) 20. A case is assumed herein that the camera unit 20 is disposed on the ceiling of a predetermined position (e.g., a path, an entrance, an exit or the like) in a shop to grasp a moving state of a human.

The camera unit 20 is disposed so that the optical axis of a lens of the camera unit 20 is parallel with a vertical direction (direction perpendicular to the floor face), and captures an image including a virtual boundary line BL (see FIG. 3 and the like) which divides a region into a first region R1 and a second region R2 in the shop. The object measuring apparatus 1 obtains the number of moving objects (humans) passing the boundary line BL on the basis of an image captured by the camera unit 20.

The controller 10 is disposed in a place (such as a monitoring room) apart from the camera unit 20.

Figure 2:
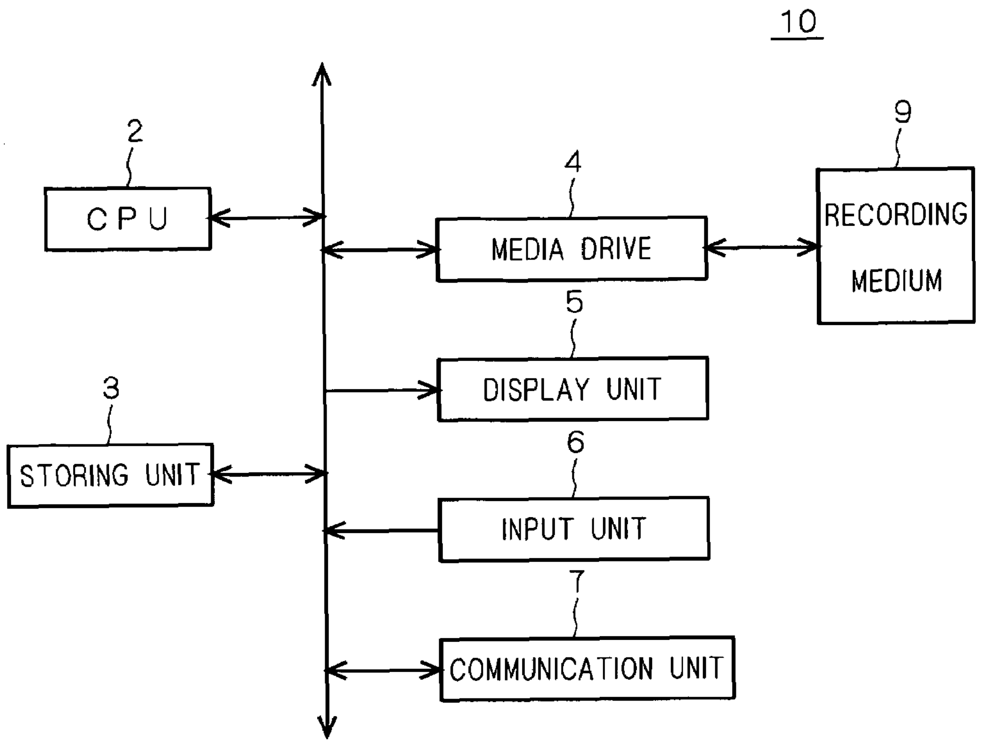
FIG. 2 is a block diagram showing a hardware configuration of a controller.

FIG. 2 is a block diagram showing a hardware configuration of the controller 10. As shown in FIG. 2, hardware of the controller 10 is configured as a computer system (hereinafter, also simply referred to as "computer") having: a CPU 2; a storing unit 3 including a main storage formed by a semiconductor memory such as a RAM (and/or ROM) and an auxiliary storage such as a hard disk drive (HDD); a media drive 4; a display unit 5 such as a liquid crystal display; an input unit 6 such as a keyboard and a mouse; and a communication unit 7 such as a network card.

The controller 10 is configured so as to be able to transmit/receive data to/from the camera unit 20 by wireless or wired data communication or the like via the communication unit 7.

The media drive 4 reads out information recorded in a portable recording medium 9 such as a CD-ROM, a DVD (Digital Versatile Disk), a flexible disk, or a memory card.

The controller 10 realizes various functions in the object measuring apparatus 1 by loading a software program (hereinafter, also simply referred to as "program") recorded in the recording medium 9 and executing the program using the CPU 2 and the like. The program having various functions is not limited to be supplied via the recording medium 9 but may be supplied to the computer via a network such as a LAN and the Internet.

Referring again to FIG. 1, the controller 10 has a moving image input unit 11, an optical flow calculating unit 12, an optical flow integrating unit 13, a passing-objects-number calculating unit 14 and a result output unit 15. The processing units 11 to 15 are schematically shown as functional portions which realize various functions of the controller 10.

The moving image input unit 11 is a processing unit for receiving, as moving images, a plurality of images sequentially captured by the camera unit 20. The optical flow calculating unit 12 is a processing unit for extracting motion vectors at a plurality of time points in each of a plurality of positions (also referred to as detection points) on the boundary line BL on the basis of a plurality of received images. The optical flow integrating unit 13 is a processing unit for obtaining an integral value by integrating components perpendicular to the boundary line of motion vectors with respect to each of positive and negative signs. The passing-objects-number calculating unit 14 is a processing unit for calculating the number of moving objects passing the boundary line on the basis of the integral value. The object measuring apparatus 1 measures the number of moving objects passing the boundary line by using the processing units. The operation in the processing units will be described in detail later.

Operation

Figure 3:
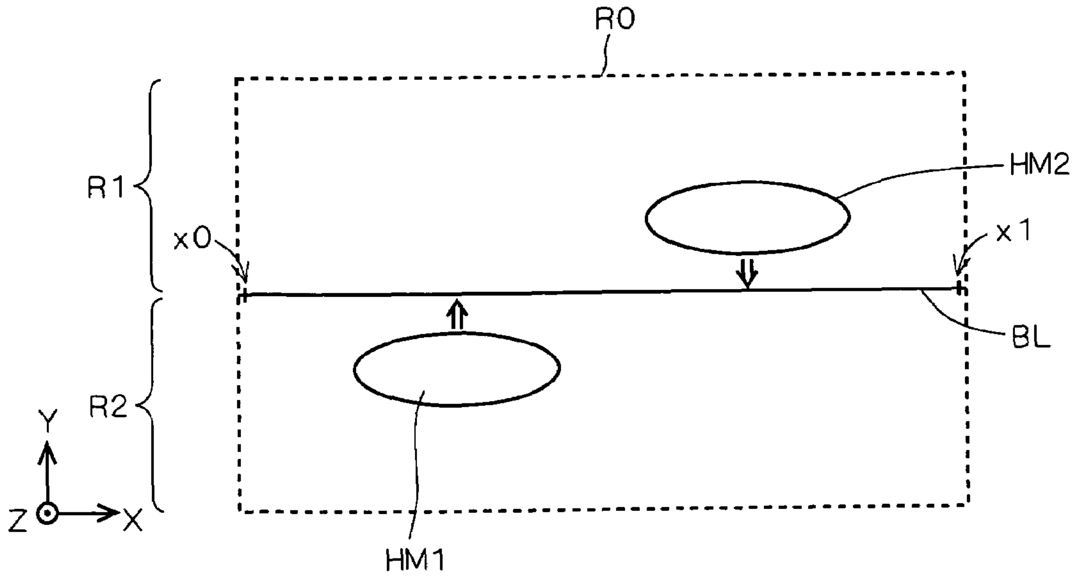
FIG. 3 is a diagram showing an image captured by a camera unit.

FIG. 3 is a diagram showing an image captured by the camera unit 20 and corresponds to an overhead view of a place (path or the like) where the camera unit 20 is disposed. Herein, X-, Y- and Z-axes are relatively fixed to the path. The Y-axis direction is a travel direction of a human as a moving object in the path. The X-axis direction is a width direction of the path (the direction orthogonal to the travel direction of a human). The Z-axis direction is a vertical direction.

FIG. 3 schematically shows a state where two humans HM1 and HM2 travel in opposite directions, respectively. Concretely, the human HM1 travels from the bottom to top of the diagram (i.e., in the +Y direction), and the human HM2 travels from the top to bottom of the diagram (i.e., in the −Y direction).

An image capturing region R0 of the camera unit 20 includes a virtually set boundary line BL. The boundary line BL is a virtual line for partitioning a region into the first and second regions R1 and R2 in a shop. In this case, the boundary line BL is a straight line extending in the lateral direction of a captured image and is positioned in an almost center in the vertical direction of the captured image. The object measuring apparatus 1 calculates the number of moving objects passing the boundary line BL by the principle described as follows.

Figure 4:
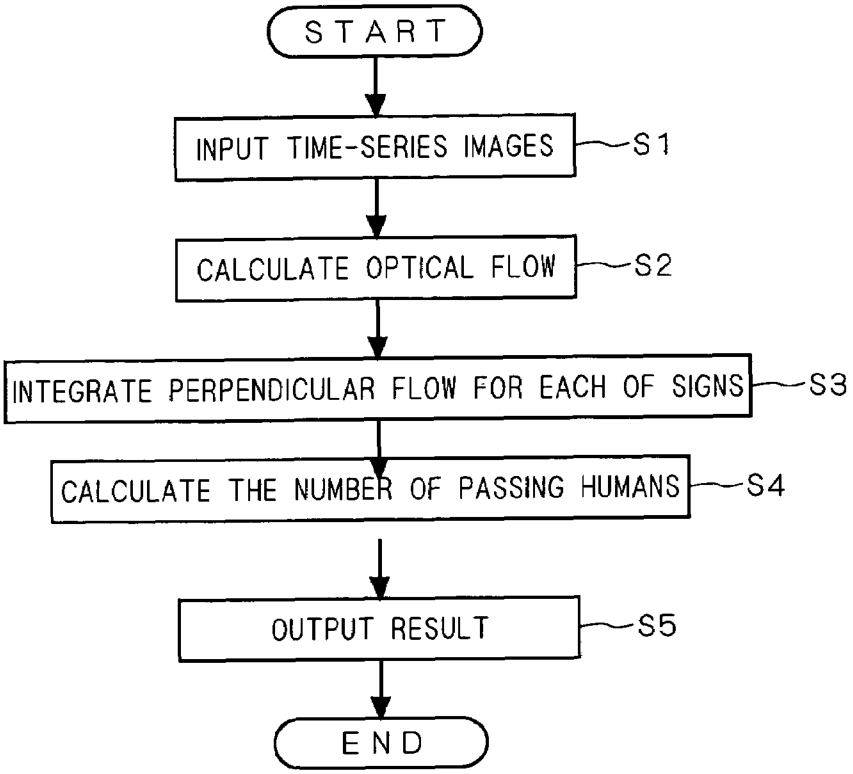
FIG. 4 is a flowchart showing the operation in the object measuring apparatus.

FIG. 4 is a flowchart showing the operation in the object measuring apparatus 1. In the following, description will be continued with reference to FIG. 4.

First, in step S1, the moving image input unit 11 receives a plurality of images (time-series images) sequentially captured by the camera unit 20. By the plurality of images, a moving image is constructed.

Next, in step S2, the optical flow calculating unit 12 extracts a motion vector V(x, t) at a plurality of times t in each of a plurality of positions x (also referred to as detection points) on the boundary line BL on the basis of the plurality of inputted images. That is, the optical flow calculating unit 12 calculates an optical flow. In step S2, a process of obtaining motion vectors on the one-dimensional boundary line BL (more specifically, motion vectors in a relatively small number of representative detection points) is performed.

The motion vector (also referred to as a flow vector) V(x, t) is extracted on the basis of a plurality of images captured over a period of time. The motion vector V(x, t) is a function of the X-coordinate value x and time t on the boundary line BL. In the following, for simplification, the motion vector will be also simply expressed as V.

Figure 5:
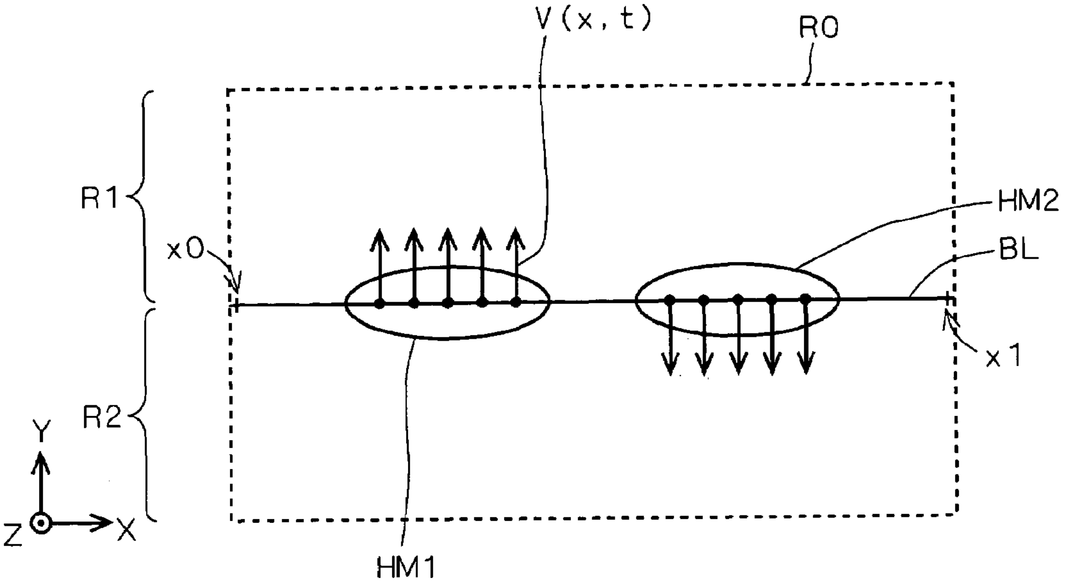
FIG. 5 is a diagram showing motion vectors V in a captured image after lapse of predetermined time since the state of FIG. 3.
Figure 6:
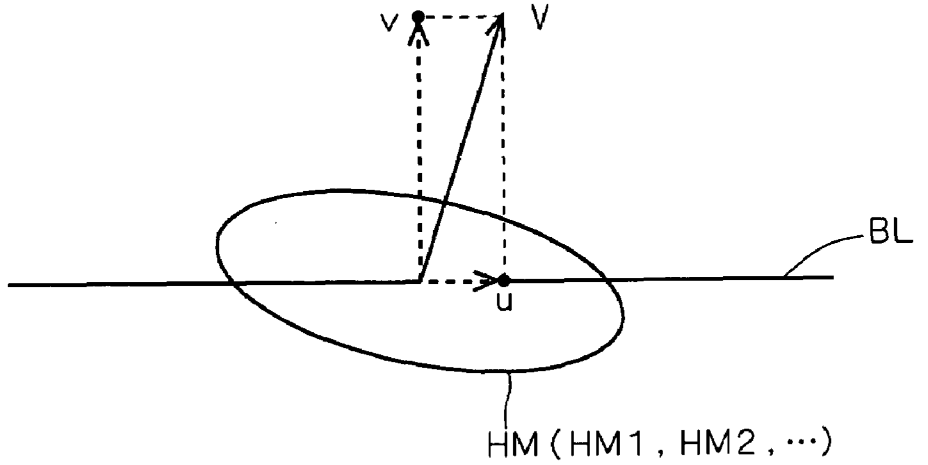
FIG. 6 is a diagram showing an X-direction component u and a Y-direction component v of the motion vector V.

FIG. 5 is a diagram showing the motion vector V in an image captured after a lapse of predetermined time since the state of FIG. 3. As shown in FIG. 5, the human HM1 travels upward in the diagram (i.e., in the +Y direction), so that the motion vector V(x, t) has a component in the +Y direction. On the other hand, the human HM2 travels downward in the diagram (i.e., in the −Y direction), so that the motion vector V(x, t) has a component in the −Y direction. In such a manner, the motion vectors V in the plurality of detection points on the boundary line BL are obtained.

Further, in step S3, the optical flow integrating unit 13 calculates an integral value by integrating components perpendicular to the boundary line BL of the motion vector V (in this case, components v in the Y direction) with respect to each of the positive and negative signs. Concretely, on the basis of Equations 1 and 2, integral values E1 and E2 are calculated, respectively. Each of the integral values E1 and E2 is an integral value derived by integrating components perpendicular to the boundary line BL of the motion vector V (with respect to time and space). The integral value can be also expressed as an integral value obtained by integrating components of one of the sign components of the positive and negative sign components v1 and v2 of the perpendicular component. For simplicity, FIG. 5 shows the case where the motion vector V has only components in the Y direction.

In reality, however, the motion vector (velocity vector) V of the human HM also includes a component u in the X direction. In this case, it is sufficient to extract only a component v in the Y direction of the motion vector V.

$$E1=\int_{t0}^{t1}\int_{x0}^{x1} v1(x,t)\,d\times dt \qquad \text{Equation 1}$$

$$E2=\int_{t0}^{t1}\int_{x0}^{x1} v2(x,t)\,d\times dt \qquad \text{Equation 2}$$

An integration range with respect to a position x is a range from a position x0 to a position x1. An integration range with respect to time t is a range from time t0 to time t1. For example, it is sufficient to set time t0 as a time point when the motion vector V which is not zero comes to be detected at any of detection points, and to set time t1 as a time point when the motion vector V which comes not to be zero is not detected at any detection points after that. The value v1(x, t) and the value v2(x, t) are expressed by Equations 3 and 4, respectively. The value v1 indicates a positive-sign component (more specifically, the absolute value of the positive-sign component) in the Y-direction component v of the motion vector V. The value v2 indicates a negative-sign component (more specifically, the absolute value of the negative-sign component) in the Y-direction component v of the motion vector V.

$$v1(x,t)=\begin{cases} v(x,t) & (v(x,t)\geq 0) \\ 0 & (v(x,t)<0) \end{cases} \qquad \text{Equation 3}$$

$$v2(x,t)=\begin{cases} 0 & (v(x,t)\geq 0) \\ -v(x,t) & (v(x,t)<0) \end{cases} \qquad \text{Equation 4}$$

The value E1 is an integral value regarding the +Y direction-component (the positive-sign component in the Y direction) of the motion vector V, and the value E2 is an integral value regarding the −Y direction-component (the negative-sign component in the Y direction) of the motion vector V.

In step S4, the passing-objects-number calculating unit 14 calculates the number of moving objects passing the boundary line on the basis of an integral value. Concretely, on the basis of Equations 5 and 6, the passing-objects-number calculating unit 14 calculates the number of people Cin who travel in the +Y direction and enter the upper region R1 from the lower region R2, and the number of people Cout who travel in the −Y direction and go out from the upper region R1.

$$Cin=\frac{E1}{S} \qquad \text{Equation 5}$$

$$Cout=\frac{E2}{S} \qquad \text{Equation 6}$$

The principle of calculation is based on the fact that each of the integral values E1 and E2 can be approximated to a square measure on an image of a passing object. By preliminarily setting a reference value S to a proper value and dividing each of the integral values E1 and E2 by the reference value S, the numbers of people Cin and Cout can be obtained.

As the reference value S, an average value of the square measure (or integral value) on an image of one moving object (the region of one human body) is preliminarily set. The average value can be preliminarily calculated from an image captured by the camera unit 20. Alternately, it is also possible to preliminarily calculate the square measure (or integral value) on an image of a human of an average size and use the calculated value as the reference value S.

In step S5, the result output unit 15 outputs the result of measurement. Concretely, the numbers of people Cin and Cout in the respective directions are displayed on the display unit 5 or the like and a file including information of the numbers of passing people Cin and Cout is outputted and stored into the storing unit 3.

In such a manner, the object measuring apparatus 1 measures the number of moving objects passing the boundary line in each of the directions of passage.

In the operation, it is sufficient to obtain the motion vectors V with respect to a relatively small number of detection points on the one-dimensional boundary line BL. As compared with the case of obtaining the motion vectors V with respect to a relatively large number of detection points in a two-dimensional region (e.g., the first conventional art), the number of detection points can be decreased. Therefore, higher processing speed can be achieved.

And the number of moving objects (people) is calculated with respect to each of the directions of travel on the basis of at least one of the integral values E1 and E2 (in this case, both of the integral values) obtained by integrating the components v in the Y direction perpendicular to the boundary line BL of the motion vector V with respect to the positive and negative signs, respectively. Consequently, even in the case where two moving objects traveling in the opposite directions simultaneously pass the boundary line BL, while preventing erroneous counting, the number of passing objects can be accurately measured. In other words, erroneous counting (concretely, erroneous counting which occurs in the case such that while a human HM1 passes the boundary line, another human HM2 who travels in the opposite direction also arrives at the boundary line) can be prevented. As described above, the object measuring apparatus 1 can count the number of moving objects passing the boundary line accurately at high speed.

Further, the passing-objects-number calculating unit 14 counts the number of moving objects on the basis of the integral values E1 and E2 and the reference value S of the integral values, so that the number of passing moving objects can be measured more accurately.

Figure 7:
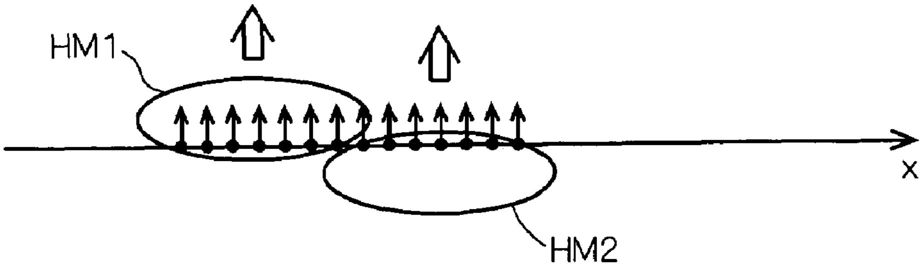
FIG. 7 is a diagram showing an image of a plurality of objects in proximity traveling in the same direction.

FIG. 7 is a diagram showing an image of a plurality of objects close to each other and traveling in the same direction. For example, as shown in FIG. 7, the second conventional art has a problem in that erroneous counting occurs in the case where a plurality of objects (humans HM1 and HM2 in FIG. 7) traveling in the same direction exist in positions close to each other. It is considered that the erroneous counting occurs while the human HM1 as one of them is passing the boundary line, another human HM2 traveling in the same direction also arrives at the boundary line.

In contrast, in the operation of the foregoing embodiment, the number of moving objects is counted on the basis of the reference value S. Consequently, even in the case where a plurality of objects (humans HM1 and HM2 in FIG. 7) exist in positions close to each other, such erroneous counting is prevented and more accurate counting process can be performed.

Although the case of obtaining the number of moving objects on the basis of the value derived by dividing each of the integral values E1 and E2 by the reference value S has been described in the foregoing embodiment, the present invention is not limited thereto. For example, it is also possible to obtain the number of moving objects by determining that one moving object exists each time the integral value from predetermined time exceeds the reference value S.

More specifically, at the time point when the integral value E1 from time t0 reaches the reference value S, the number of passing people is counted up, and the integral value E1 is reset (cleared). After that, each time the integral value E1 reaches the reference value S, similar operation is repeated. Alternately, at the time point when the integral value E1 from the time t0 reaches n×S (a value which is n times as large as the reference value S), the number of passing people may be sequentially updated from (n−1) to n.

Optical Flow

An example of the detailed operation of step S2, that is, the operation of calculating an optical flow will now be described. In diagrams to be described below (FIG. 9 and subsequent diagrams), for convenience of the diagrams, a whole region of each image is shown. In an actual process, it is sufficient to perform imaging process (to be described later) only on a region around the boundary line BL in the whole region of each image. By the process, motion vectors V of a relatively small number of detection points on the one-dimensional boundary line BL, in other words, an optical flow in a region in the vicinity of the boundary line BL can be obtained.

As methods of calculating an optical flow, various methods such as a correlation method and a gradient method can be used. A case of calculating an optical flow by using a gradient method capable of realizing higher processing speed will be described herein. The gradient method uses that the following equation 7 regarding a pixel value I(x, y, t) at time t of a pixel in a position (x, y) and a flow vector $V=(u, v)^T$ (T which is the capital letter of the numerical subscript at the upper right denotes 'transpose' of a vector or matrix, this definition will be the same also in the following) is satisfied. In the following, the pixel value I(x, y, t) or the like will be also simply described as a pixel value I or the like.

$$I_x \cdot u + I_y \cdot v + I_t = 0 \qquad \text{Equation 7}$$

where $I_x$ denotes a partial differential of the pixel value I with respect to a position x, $I_y$ denotes a partial differential of the pixel value I with respect to a position y, and It indicates a partial differential of the pixel value I with respect to time t. Each of the values $I_x$, $I_y$ and $I_t$ is obtained on the basis of two images with a subtle time interval, for example, an image $I^{(t-1)}$ at time (t−1) and an image $I^{(t)}$ at time t.

In Equation 7, two unknown values (u, v) exist, so that a solution is not unconditionally obtained only by Equation 7. Consequently, it is assumed that the relational expression of Equation 7 regarding the same unknown values (u, v) is satisfied with respect to each of a plurality of pixels (e.g., 5 pixels×5 pixels=25 pixels) in a local region, and a plurality of equations are led. An approximate solution satisfying the plurality of equations is calculated by the least square method and is used as a solution to the unknown values (u, v).

In the case where a subject travels at high speed, a displacement distance of corresponding pixels in two images is large. Consequently, in the case of using only an original image having relatively high resolution, a motion vector may not be accurately obtained. A case of employing a multi-resolution strategy using a plurality of images of different resolutions (also referred to as pyramid images or simply a pyramid) will now be described herein. With the strategy, also in the case where not only a subtle change between images but also a relatively large change (i.e., high-speed change) exist, a motion vector can be obtained more accurately.

In order to enhance robustness against a change in space of brightness of a background, herein, it is assumed that the gradient method is applied to a Laplacian image. Concretely, images of different resolutions (i.e., pyramid images) in the multi-resolution strategy are obtained as Laplacian images.

Figure 8:
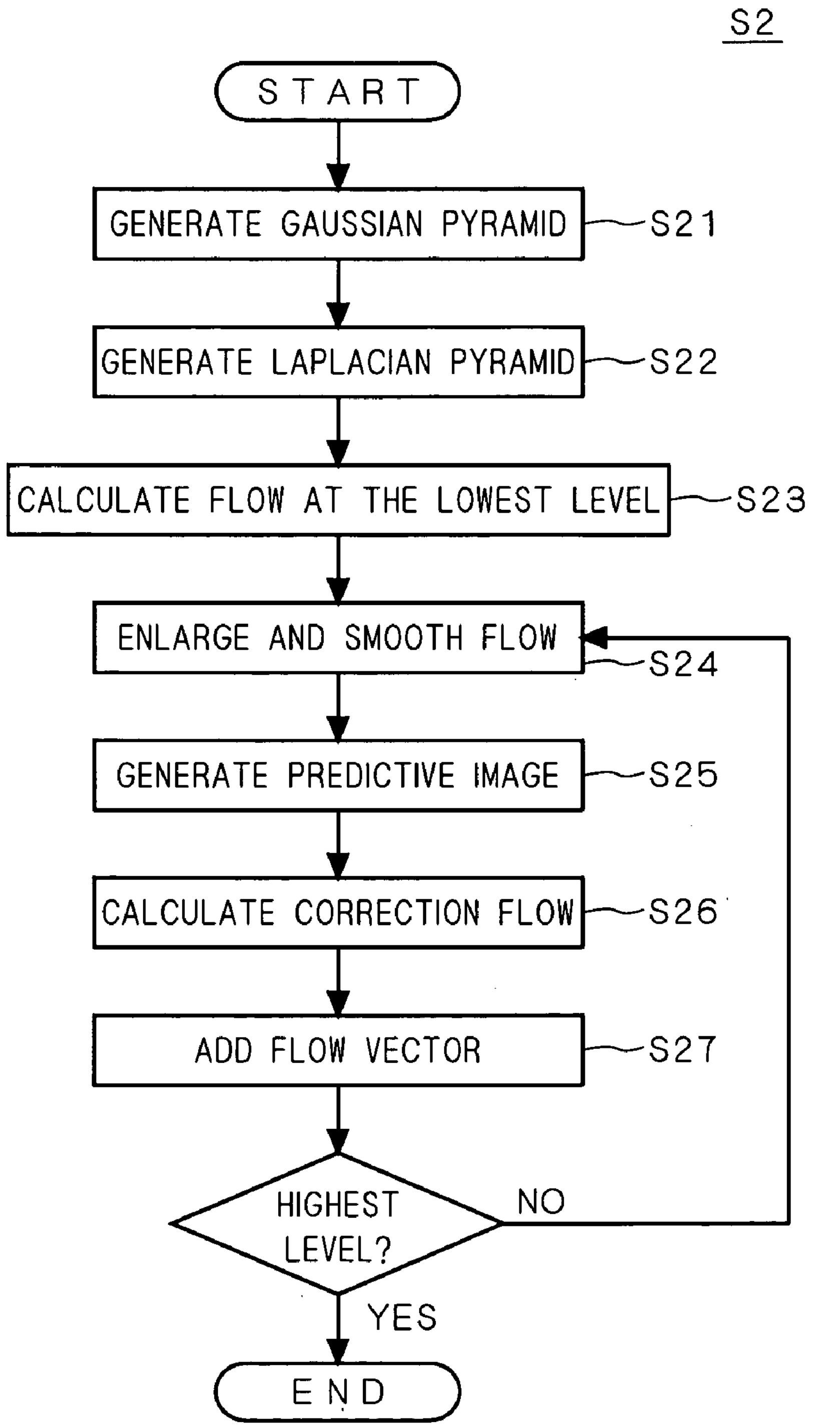
FIG. 8 is a flowchart showing the detailed operation of generating an optical flow.

FIG. 8 is a detailed flowchart showing the optical flow generating process in step S2.

As shown in FIG. 8, first, with respect to each of the image $I^{(t-1)}$ at time (t−1) and the image $I^{(t)}$ at time t, a Gaussian pyramid is generated (step S21) and a Laplacian pyramid is generated (step S22).

Figure 9:
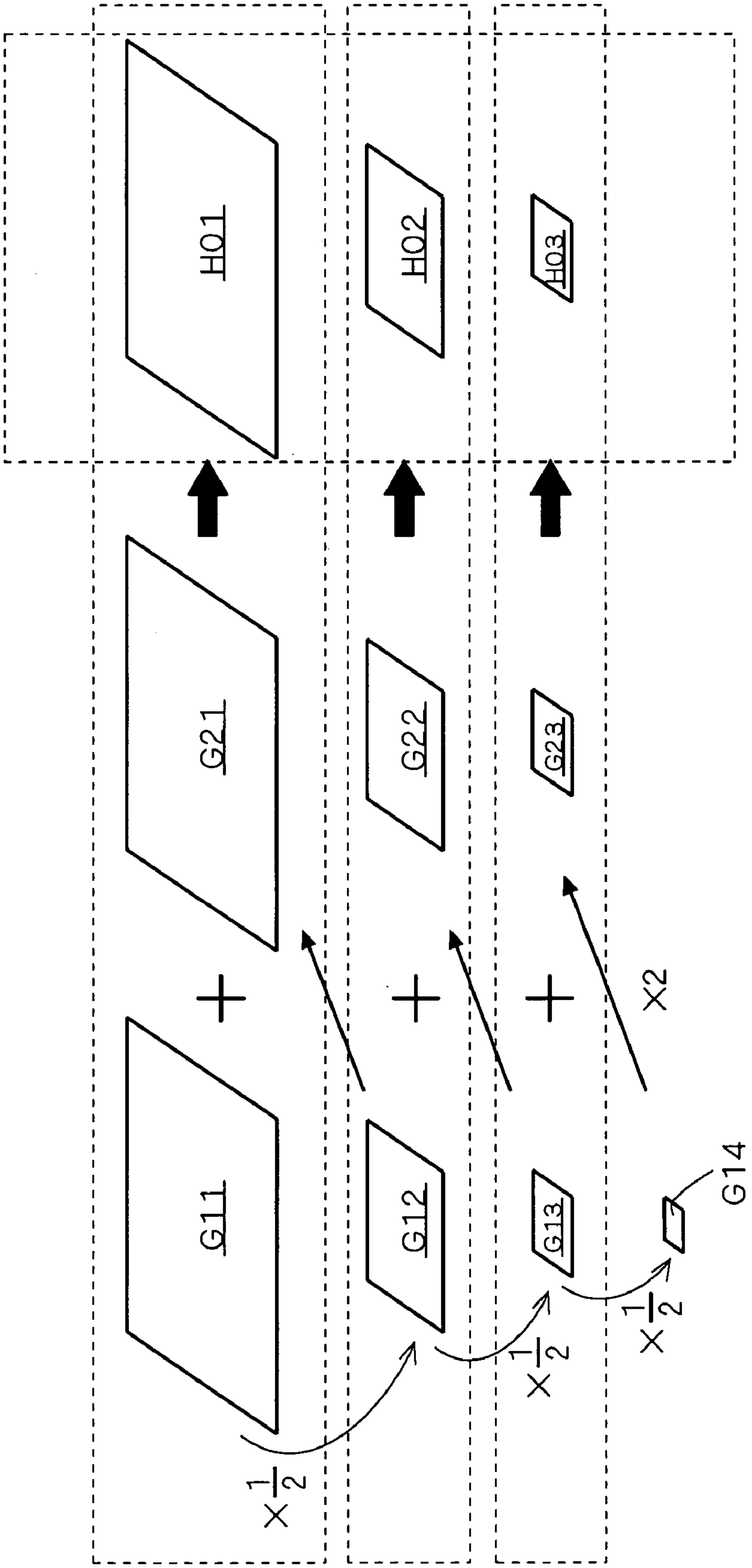
FIG. 9 is a conceptual diagram showing a process of generating a Laplacian pyramid.

FIG. 9 is a diagram conceptually showing a Laplacian pyramid generating process. Referring to FIG. 9, the process of generating a Laplacian pyramid (H01, H02 and H03) regarding the image $I^{(t-1)}$ at time (t−1) will be described. Each of images G12 to G14, G21 to G23, and H01 to H03 in FIG. 9 is an image generated by being derived from an original image G11 having original resolution at time (t−1) and is the image $I^{(t-1)}$ at time (t−1). Although an image pyramid of three (or four) levels is illustrated as an example herein, the present invention is not limited thereto, but an image pyramid having an another number of levels may be generated.

Concretely, a size reducing process accompanying a Gaussian process smoothing process) is performed on the image G11 having the original resolution at time (t−1), thereby generating images G12, G13 and G14 having resolutions of ½, ¼ and ⅛ of the original resolution, respectively. In such a manner, a Gaussian pyramid constructed by a plurality of images G11, G12, G13 and G14 in a plurality layers is generated.

Next, by performing a Gaussian enlarging process (enlarging process accompanying the smoothing process) on the reduced images G14, G13 and G12 at the hierarchical levels of the Gaussian pyramid, each of the reduced images is doubled, thereby generating images G23, G22 and G21, respectively, having resolutions matching to those of images at levels higher by one level. For example, by performing the Gaussian enlarging process on the reduced image G14, the image G23 having the same resolution as that of the reduced image G13 is generated. Similarly, the image G22 having the same resolution as that of the reduced image G12 is generated, and the image G21 having the same resolution as that of the reduced image G11 is also generated.

By subtracting the pixel values of the images G13, G12 and G11 from the pixel values of the images G23, G22 and G21 subjected to the Gaussian enlarging process, at the respective corresponding level, the Laplacian images H03, H02 and H01 at respective levels are obtained. The Laplacian images H03, H02 and H01 are images equivalent to, for example, processed images obtained by a Laplacian filter (edge emphasizing filter) as shown in FIG. 10.

By the process as described above, a plurality of Laplacian images of a plurality of resolutions, that is, the Laplacian pyramid (H01, H02 and H03) are/is obtained.

Figures 10, 11:
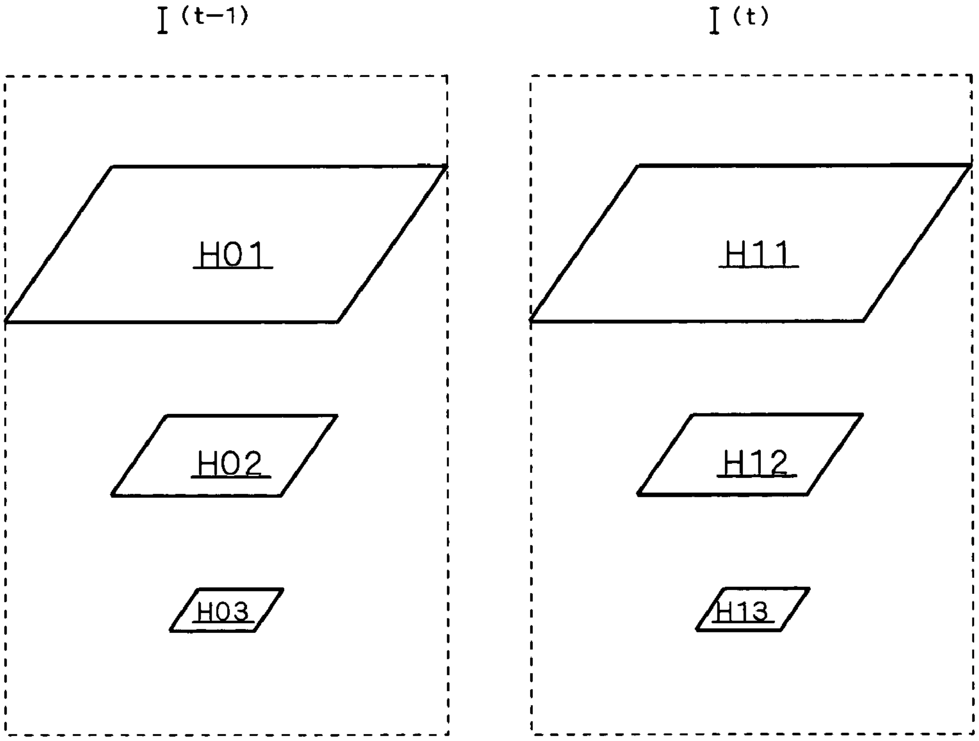
FIG. 10 is a diagram showing an example of a Laplacian filter.
FIG. 11 is a conceptual diagram showing Laplacian pyramids at time t and time (t−1)

Similar processes are performed on the image $I^{(t)}$ at time t and, as shown in FIG. 11, a plurality of Laplacian images of different resolutions are generated as a Laplacian pyramid (H111, H112 and H113).

By the above, as shown in FIG. 11, the Laplacian pyramids (H01, H02, H03) and (H11, H112, H113) with respect to the images $I^{(t)}$ and $I^{(t-1)}$ at two time points t and (t−1) are obtained.

The multi-resolution strategy using a Laplacian pyramid will now be described. The distance between corresponding pixels in images (reduced images) having relatively low resolution at two time points with a subtle time interval is smaller than that of corresponding pixels of images at the same time points of the original resolution (relatively high resolution), so that a "motion vector (flow vector)" is obtained more easily. In the multi-resolution strategy, by using such a characteristic, a motion vector is obtained first in the images of relatively low resolution. By gradually setting the motion vector to that of the image of relatively high resolution (the image at a higher level), the motion vector at the highest resolution (original resolution) is obtained. By employing the method, as described above, even in the case where a sufficiently accurate motion vector cannot be obtained only from the image of the original resolution since the motion vector is large, the motion vector can be obtained relatively accurately.

Figure 12:
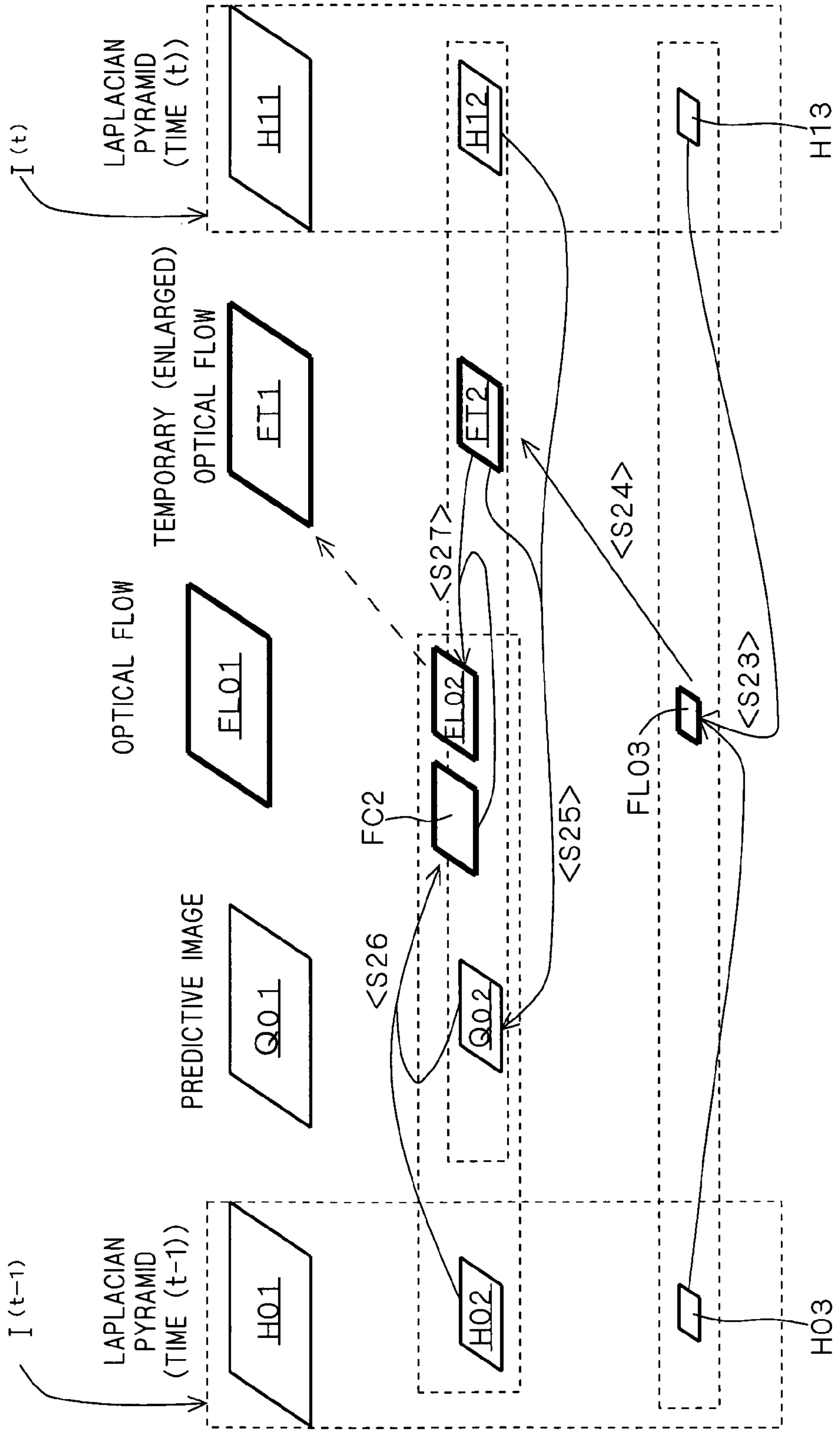
FIG. 12 is a conceptual diagram showing an outline of the operation in a multi-resolution strategy.

FIG. 12 is a conceptual diagram showing an outline of the operation in the multi-resolution strategy. In the following, description will be continued also with reference to FIG. 12.

First, in step S23, a flow vector at the lowest level is calculated. Concretely, as shown in FIG. 9, an optical flow FL03 is calculated on the basis of the image H03 having the lowest resolution at time (t−1) and the image H13 having the lowest resolution at time t. Specifically, as described above, on assumption that a plurality of pixels in a local area have the same motion vector, a motion vector $(u, v)^T$ of each of pixels in a plurality of positions is calculated by the least square method, thereby generating the optical flow FL03 with respect to an image at the lowest level.

On the basis of the optical flow FL03 at the lowest level, an optical flow FL02 of an image at the next higher level is obtained (steps S24 to S27).

Figure 13:
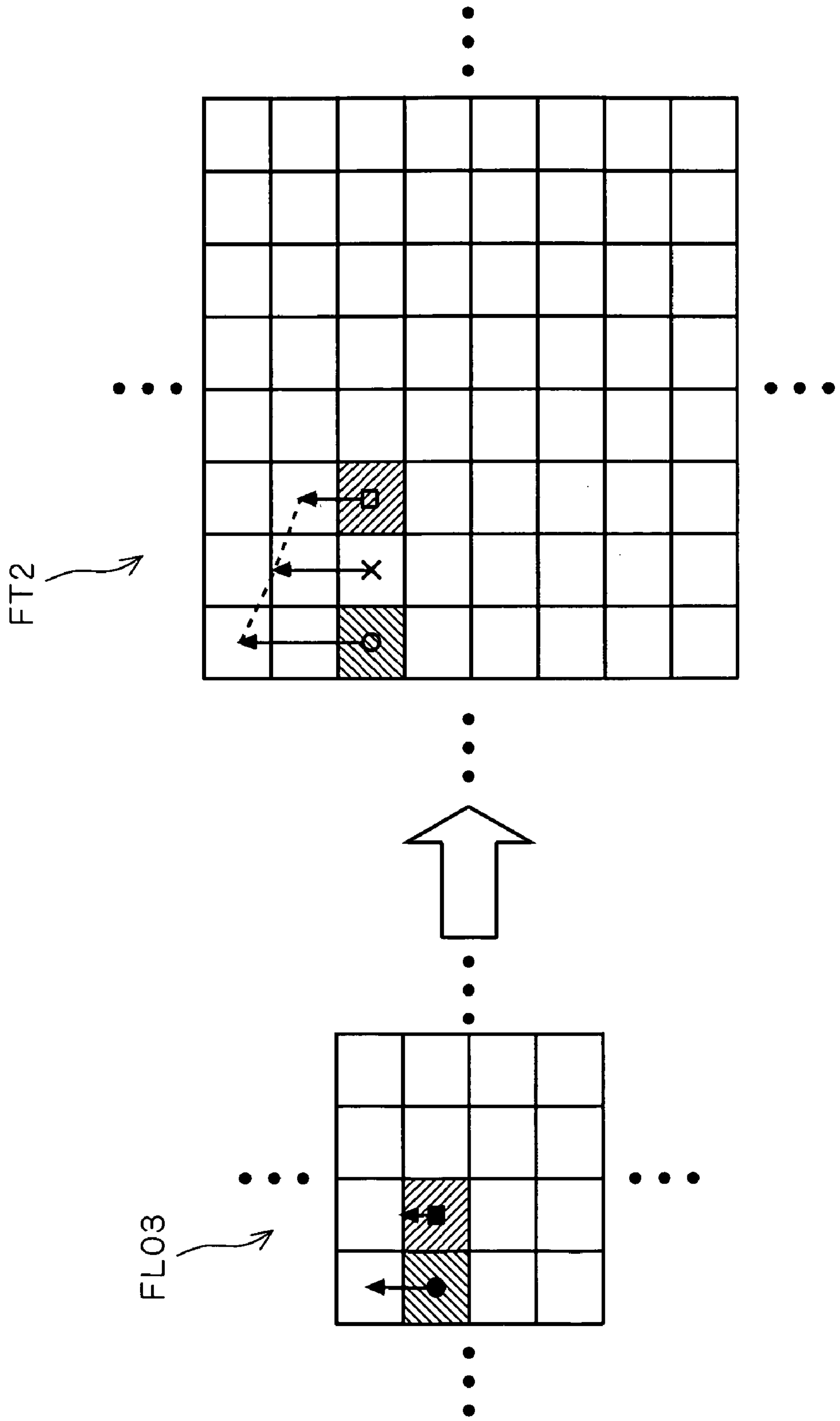
FIG. 13 is a conceptual diagram showing a process of generating an enlarged optical flow FT2.

First, in step S24, an enlarging process accompanying a predetermined interpolating process (bilinear interpolation or the like) is performed on the optical flow FL03, thereby generating an enlarged optical flow FT2 in which a motion vector at each of pixels of an image having a resolution twice as high as that of the image at the lower level is specified (see FIG. 13).

FIG. 13 is a conceptual diagram showing a state of generation of the enlarged optical flow FT2. As shown in FIG. 13, as a rule, the motion vector in each of the pixels of the enlarged optical flow FT2 is obtained by doubling the motion vector of the corresponding pixel in the optical flow FL03. For example, in FIG. 13, the motion vector in the position shown by a blank circle in the enlarged optical flow FT2 is obtained by doubling the motion vector in the corresponding position (position indicated by the painted circle) in the optical flow FL03. With respect to a pixel in a position where a corresponding pixel does not exist, a motion vector in the position is obtained by an interpolating process using motion vectors of peripheral pixels. For example, the motion vector in the position indicated by x in the enlarged optical flow FT2 is obtained by the interpolating process based on the motion vectors in the peripheral positions (the position indicated by the blank circle and the position indicated by the painted circle in FIG. 13).

In step S25, by using the enlarged optical flow FT2 and a Laplacian image H12 at the same level at the following time t, a predictive image Q02 at time (t−1) is obtained.

The image at time (t−1) is the image H12 at the following time t after a travel by the motion vector. Therefore, on assumption that the predictive image Q02 is correct, the pixel value of each of pixels in the predictive image Q02 is equal to that of the pixel after movement by the motion vector of the enlarge optical flow FT2 in the image H12.

On the basis of such a characteristic, the pixel value of each of pixels in the predictive image Q02 is obtained as a pixel value in the corresponding position in the image H12. The corresponding position in the image H12 is a position at the end point of the motion vector of which start point is the original position (x, y).

Figure 14:
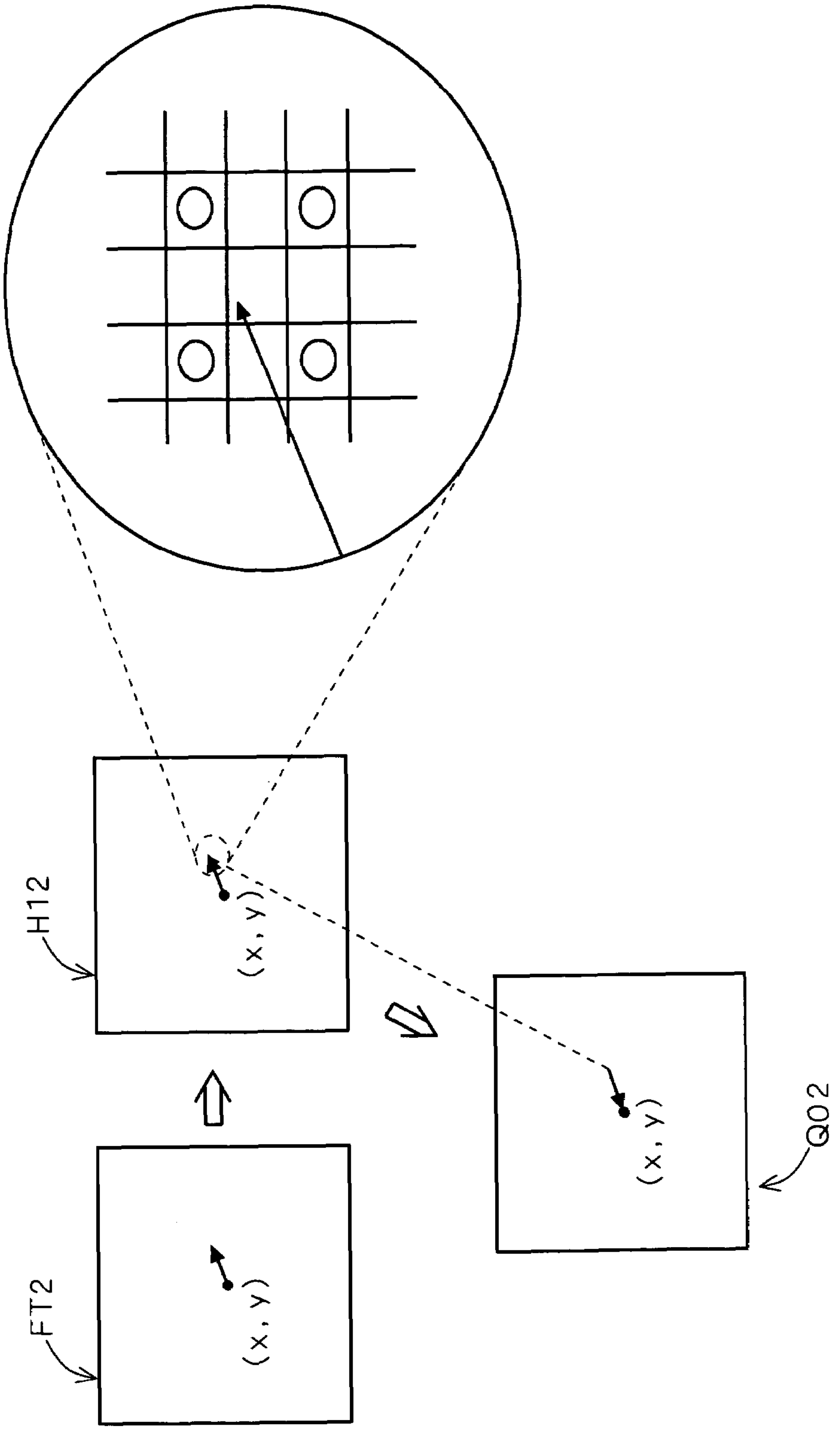
FIG. 14 is a conceptual diagram showing the operation of obtaining a predictive image Q02.

In order to obtain a more accurate value, as shown in FIG. 14, a weighted mean value of pixel values of four pixels (pixels in positions of blank circles in FIG. 14) around the end point position of the motion vector is calculated. The weighted mean value is determined as a pixel value of the pixel in the predictive image Q02.

By repeating such an operation with respect to each of pixels, the predictive image Q02 can be obtained.

When the enlarged optical flow FT02 is correct, the predictive image Q02 and the Laplacian image H02 at time (t−1) coincide with each other. However, in many cases, a difference amount exists.

In step S26, a correction optical flow FC2 for correcting the difference amount is calculated. The correction optical flow FC2 is calculated on the basis of two images Q02 and H02. Concretely, as described above, on assumption that a plurality of pixels in a local area have the same motion vector, a motion vector in each of pixels in a plurality of positions is calculated by using the least square method.

In step S27, an optical flow obtained by correcting the original enlarged optical flow FT2 on the basis of the correction optical flow FC2 by using a vector adding process is calculated as an optical flow FL02.

In such a manner, on the basis of the optical flow FL03 at the lowest level, the optical flow FL02 of an image at the next higher level is generated.

Further, in step S28, whether the optical flow FL01 at the highest level is generated or not is determined. Since the optical flow FL01 of the highest level is not generated yet at this time point, the program returns to step S24.

By repeating the processes in steps S24 to S27 on the basis of the optical flow FL02, the optical flow FL01 at the next higher level is obtained. The processes in steps S24 to S27 are repeated until generation of the optical flow at the highest level is recognized in step S28.

After completion of the process up to the highest level is recognized in step S28, the process is finished. As a result, the optical flow FL01 is generated as an optical flow at the time (t−1) regarding the image of the maximum resolution (original resolution).

The optical flow at the following time t is generated by applying the processes in steps S21 to S28 on the basis of the image $I^{(t)}$ at time t and the image $I^{(t+1)}$ at time (t+1). The optical flows at the time points are sequentially generated by repeating processes similar to the above.

Although the case of obtaining a predictive image at time (t−1) on the basis of the optical flow at time (t−1) in step S25 has been described as an example, the present invention is not limited thereto. For example, it is also possible to obtain a predictive image regarding the following time t on the basis of the optical flow at time (t−1) and compare the predictive image with the image $I^{(t)}$, thereby generating a correction optical flow. In this case, however, peripheral pixels as shown in FIG. 14 cannot be assumed, so that it is difficult to improve precision of generation of the predictive image regarding the time t.

Another Method Of Obtaining Optical Flow (Modification)

In the above, the case of generating the optical flow at each time by repeating the processes in steps S21 to S28 has been described. The present invention, however, is not limited thereto. For example, an optical flow at each time may be generated by using a process as described below.

Figure 15:
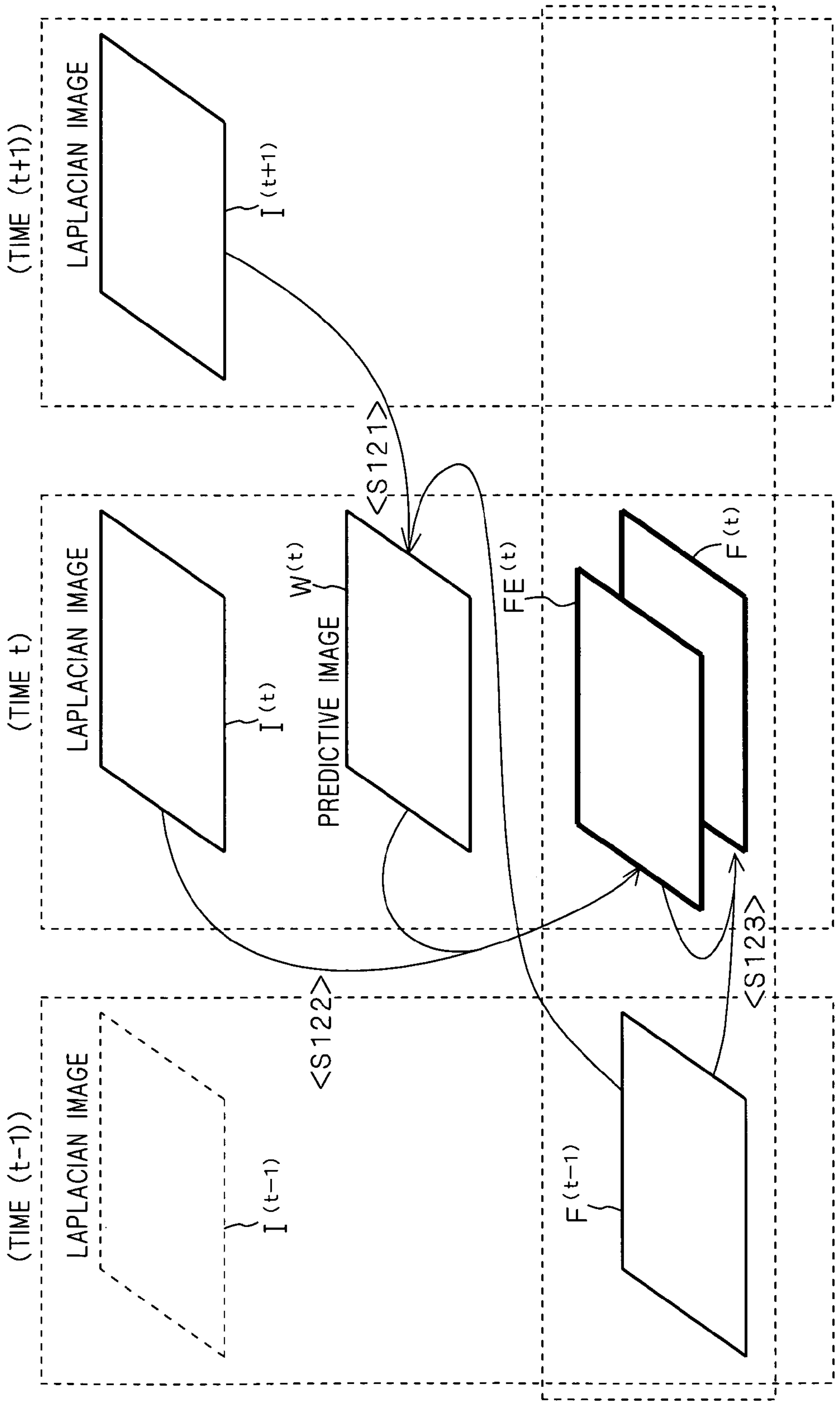
FIG. 15 is a conceptual diagram showing a modification of obtaining an optical flow.

Concretely, once an optical flow $F^{(t-1)}$ at time (t−1) is obtained by the processes of steps S21 to S28 or the like, an optical flow $F^{(t)}$ at the following time t can be generated by using the optical flow $F^{(t-1)}$ at the preceding time (t−1). By this method, without using the multi-resolution strategy, in other words, without using an image pyramid, the optical flow $F^{(t)}$ can be obtained. Thus, higher processing speed can be achieved. In the following, the operation of the modification will be described with reference to FIGS. 15 and 16. FIG. 15 is a conceptual diagram showing the operation, and FIG. 16 is a flowchart showing the operation.

It is assumed here that the optical flow $F^{(t-1)}$ and Laplacian images $I^{(t+1)}$ and $I^{(t)}$ are obtained in advance. The Laplacian image $I^{(t+1)}$ can be obtained by performing an imaging process using, for example, the Laplacian filter shown in FIG. 10 on an original image captured at time (t+1). The Laplacian image $I^{(t)}$ can be obtained by performing an imaging process using a similar Laplacian filter on the original image captured at time t.

Figure 16:
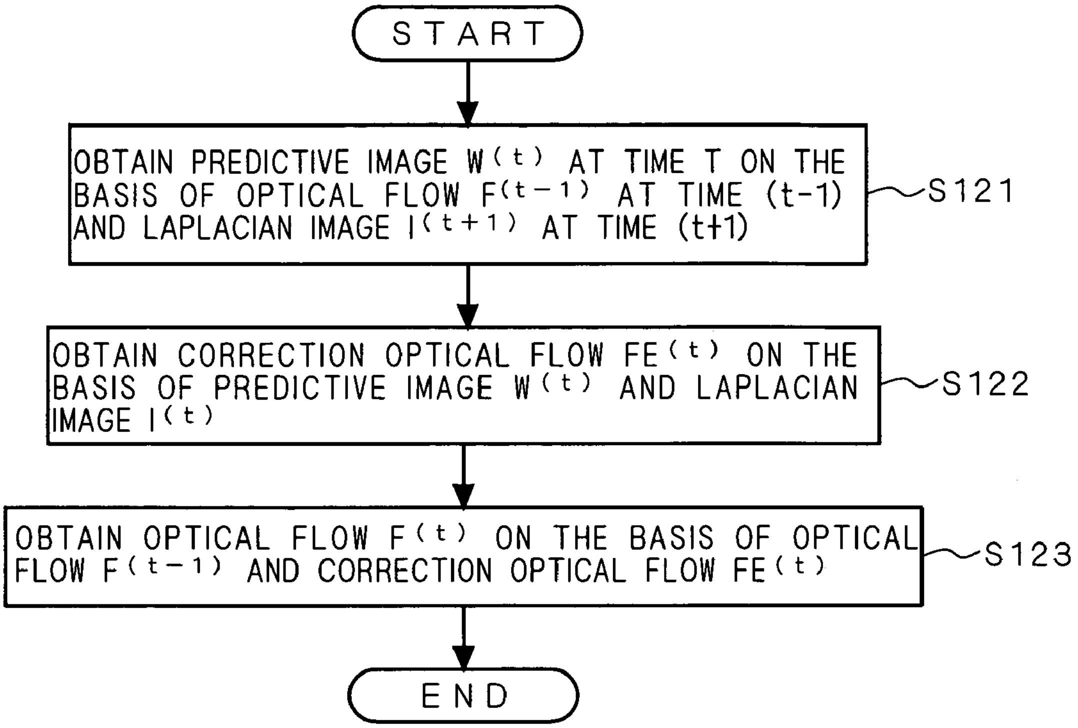
FIG. 16 is a flowchart according to a modification of FIG. 15.

As shown in FIGS. 15 and 16, first, in step S121, on the basis of the optical flow $F^{(t-1)}$ at time (t−1) and the Laplacian image $I^{(t+1)}$ at time (t+1), a predictive image $W^{(t)}$ at time t is obtained.

The image at time t becomes the Laplacian image $I^{(t+1)}$ at the following time (t+1) after movement by the motion vector of the optical flow $F^{(t)}$. Therefore, on assumption that the predictive image $W^{(t)}$ is correct, the pixel value of each of pixels of the predictive image $W^{(t)}$ is equal to that of a pixel in a position after the movement according to the motion vector of the optical flow $F^{(t)}$ in the Laplacian image $I^{(t+1)}$.

On the basis of such a characteristic, the pixel value of each of the pixels of the predictive image $W^{(t)}$ is obtained as a pixel value in a corresponding position in the Laplacian image $I^{(t+1)}$. The corresponding position in the Laplacian image $I^{(t+1)}$ is an end point position $(x+u^{(t-1)}, y+v^{(t-1)})$ of a motion vector $(u^{(t-1)}, v^{(t-1)})^T$ using the original position (x, y) as a start point. In this case, however, is it assumed that the optical flow $F^{(t)}$ is equal to the optical flow $F^{(t-1)}$.

The pixel value of each of pixels of the predictive image $W^{(t)}$ is obtained by, concretely, the following Equation 8.

$$W^{(t)}(x,y)=I^{(t+1)}(x+u^{(t-1)}(x,y),\ y+v^{(t-1)}(x,y)) \qquad \text{Equation 8}$$

In Equation 8, the pixel value in each pixel position (x, y) in the predictive image $W^{(t)}$is expressed as $W^{(t)}(x, y)$.

In order to obtain a value which is more accurate, in a manner similar to step S25, a weighted mean value of pixel values of four pixels around the end point position $(x+u^{(t-1)}, y+v^{(t-1)})$ in the image $I^{(t+1)}$of the motion vector $(u^{(t-1)}, v^{(t-1)})^T$ using the original position (x, y) as a start point is calculated. The weighted mean value is determined as the pixel value of the pixel in the predictive image $W^{(t)}$.

By repeating such an operation with respect to each of the pixels, the predictive image $W^{(t)}$ is obtained.

When the optical flows $F^{(t)}$ and $F^{(t-1)}$ are the same, the predictive image $W^{(t)}$ and the Laplacian image $I^{(t)}$ coincide with each other. However, in many cases, a difference exists.

In the following step S122, a correction optical flow $FE^{(t)}$ for correcting the difference amount is calculated. The correction optical flow $FE^{(t)}$ is calculated on the basis of the predictive image $W^{(t)}$and the Laplacian image $I^{(t)}$.

Concretely, assuming that a plurality of pixels in a local area have the same motion vector, a motion vector of each of pixels in a plurality of positions is calculated by using the least square method.

In step S123, an optical flow obtained by correcting the optical flow $F^{(t-1)}$ on the basis of the correction optical flow $FE^{(t)}$ by using a vector adding process is derived as the optical flow $F^{(t)}$.

Concretely, elements of each motion vector $(u^{(t)}, v^{(t)})^T$ in the optical flow $F^{(t)}$ is expressed by the following Equations 9 and 10 by using a correction motion vector $(u_e^{(t)}, v_e^{(t)})^T$ of the correction optical flow $FE^{(t)}$. In Equations 9 and 10, each of the elements $u^{(t)}$, $v^{(t)}$, $u^{(t-1)}$, $v^{(t-1)}$, $u_e^{(t)}$ and $v_e^{(t)}$ is a function in a position x, y.

$$u^{(t)}(x, y)=u_e^{(t)}(x, y)+u^{(t-1)}(x+u_e^{(t)}(x, y), y+v_e^{(t)}(x, y)) \quad \text{Equation 9}$$

$$v^{(t)}(x, y)=v_e^{(t)}(x, y)+v^{(t-1)}(x+u_e^{(t)}(x, y), y+v_e^{(t)}(x, y)) \quad \text{Equation 10}$$

In such a manner, the optical flow $F^{(t)}$ at the following time t can be generated by using the optical flow $F^{(t-1)}$ at the preceding time (t−1).

Similarly, the optical flow $F^{(t+1)}$ at the following time (t+1) can be also generated by using the optical flow $F^{(t)}$ at time t. Concretely, it is sufficient to apply operations similar to those in steps S121 to S123 to the optical flow $F^{(t)}$ at time t and the Laplacian image $I^{(t+2)}$ at time (t+2).

Subsequently, an optical flow at the following time can be similarly generated by using an optical flow at the immediately preceding time.

As described above, by such an operation, without using the multi-resolution strategy, that is, without using an image pyramid, the optical flow can be obtained. Thus, higher processing speed can be achieved.

Other Modifications

In the foregoing embodiments, the case of realizing the process by software process in a computer has been described. The present invention is not limited thereto, and a similar process may be executed by using a dedicated hardware circuit.

Although a general computer system has been mentioned as a computer in the foregoing embodiments, the present invention is not limited to the general computer system. A similar process may be executed by using, as the "computer", an embedded microcomputer or the like (computing processor). A program may be loaded into such an embedded microcomputer.

Further, the case of obtaining both of the number of passing people in the +Y direction and the number of passing people in the −Y direction has been described in the foregoing embodiments. However, the present invention is not limited to the case, and only the number of passing people in one direction (e.g., the number of passing people in the +Y direction) may be calculated. In other words, although the case of obtaining both of the first integral value E1 regarding component values of the positive sign and the second integral value E2 regarding component values of the negative sign has been described above, the present invention is not limited thereto. Only the integral value of the component values of one of the positive and negative signs may be obtained.

Concretely, only the number of passing people in the +Y direction may be obtained on the basis of only the integral value E1 obtained by integrating v1 as positive-sign components in components v perpendicular to the boundary line of a motion vector.

As described above, it is sufficient to obtain the number of moving objects (humans) passing the boundary line BL on the basis of the integral value E1 and/or the integral value E2 (in other words, at least one of the integral values E1 and E2) obtained by integrating components perpendicular to the boundary line of the motion vector with respect to the positive and negative signs.

In the foregoing embodiments, the case of obtaining, as an integral value obtained by integrating components perpendicular to the boundary line BL of the motion vector, at least one integral value obtained by integrating perpendicular components of one of the positive and negative signs, the perpendicular components being distinguished from another perpendicular components of the other one of both signs, has been described. Consequently, even there is the possibility that a plurality of moving objects travel not only in the same direction but also in the opposite direction, erroneous counting is prevented, and the number of passing objects can be measured accurately.

The present invention, however, is not limited to such a mode. For example, in the case where it is preliminarily known that the directions of movement of a plurality of moving objects are the same, the components perpendicular to the boundary line BL of the motion vector are always non-negative components (or always non-positive component). It is therefore sufficient to obtain the number of moving objects passing the boundary line on the basis of an integral value obtained by (without intentionally integrating components for each of the signs independently but simply) integrating components perpendicular to the boundary line BL of the motion vector. Particularly, when the number of moving objects passing the boundary line BL is calculated on the basis of an obtained integral value and a reference value regarding the integral value, the number of moving objects can be obtained more accurately.

While the invention has been shown and described in detail, the foregoing description is in all aspects illustrative and not restrictive. It is therefore understood that numerous modifications and variations can be devised without departing from the scope of the invention.

What is claimed is:

1. An object measuring system for measuring the number of moving objects passing a boundary line, comprising:

an extractor for extracting motion vectors at a plurality of times in each of a plurality of positions on said boundary line on the basis of a plurality of images;

an integrator for obtaining at least one integral value derived by integrating perpendicular components perpendicular to said boundary line of said motion vectors, said at least one integral value being derived by integrating the perpendicular components of one of positive and negative signs; and a calculator for calculating the number of moving objects passing said boundary line on the basis of said at least one integral value.

2. The object measuring system according to claim 1, wherein said calculator calculates the number of said moving objects on the basis of said at least one integral value and a reference value regarding the at least one integral value.

3. The object measuring system according to claim 2, wherein said calculator calculates the number of said moving objects on the basis of a value derived by dividing said at least one integral value by said reference value.

4. The object measuring system according to claim 2, wherein said calculator calculates the number of said moving objects on the basis of determination that one moving object exists each time said at least one integral value exceeds said reference value and said at least one integral value is cleared.

5. The object measuring system according to claim 2, wherein said reference value is a predetermined value as an average area value per one moving object in said image.

6. The object measuring system according to claim 1, wherein said at least one integral value includes a first integral value derived by integrating positive-sign perpendicular components of said motion vectors, and a second integral value derived by integrating negative-sign perpendicular components of said motion vectors.

7. An object measuring method for measuring the number of moving objects passing a boundary line, comprising the steps of:

(a) extracting motion vectors at a plurality of times in each of a plurality of positions on said boundary line on the basis of a plurality of images;

(b) obtaining at least one integral value derived by integrating perpendicular components perpendicular to said boundary line of said motion vectors, said at least one integral value being derived by integrating the perpendicular components of one of positive and negative signs; and (c) calculating the number of moving objects passing said boundary line on the basis of said at least one integral value.

8. The object measuring system according to claim 7, wherein said at least one integral value includes a first integral value derived by integrating positive-sign perpendicular components of said motion vectors, and a second integral value derived by integrating negative-sign perpendicular components of said motion vectors.

9. A program residing on a recording medium that can be read by a computer provided in a controller in an object measuring system for measuring the number of moving objects passing a boundary line, the program executing the steps of:

(a) extracting motion vectors at a plurality of times in each of a plurality of positions on said boundary line on the basis of a plurality of images;

(b) obtaining at least one integral value derived by integrating components perpendicular to said boundary line of said motion vectors, said at least one integral value being derived by integrating the perpendicular components of one of positive and negative signs; and (c) calculating the number of moving objects passing said boundary line on the basis of said at least one integral value.

10. The program according to claim 9, wherein said at least one integral value includes a first integral value derived by integrating positive-sign perpendicular components of said motion vectors, and a second integral value derived by integrating negative-sign perpendicular components of said motion vectors.

11. An object measuring system for measuring the number of moving objects passing a boundary line, comprising:

an extractor for extracting motion vectors at a plurality of times in each of a plurality of positions on said boundary line on the basis of a plurality of images;

an integrator for obtaining an integral value by integrating components perpendicular to said boundary line of said motion vectors; and a calculator for calculating the number of moving objects passing said boundary line on the basis of said at least one integral value and a reference value regarding the integral value.

12. The object measuring system according to claim 11, wherein said calculator calculates the number of said moving objects on the basis of a value derived by dividing said integral value by said reference value.

13. The object measuring system according to claim 11, wherein said calculator calculates the number of said moving objects on the basis of determination that each time said integral value exceeds said reference value, one moving object exists.

14. The object measuring system according to claim 11, wherein said reference value is a predetermined value as an average area value per one moving object in said image.

15. An object measuring method for measuring the number of moving objects passing a boundary line, comprising the steps of:

(a) extracting motion vectors at a plurality of times in each of a plurality of positions on said boundary line on the basis of a plurality of images;

(b) obtaining an integral value by integrating components perpendicular to said boundary line of said motion vectors; and (c) calculating the number of moving objects passing said boundary line on the basis of said integral value and a reference value regarding the integral value.

16. A program residing on a recording medium that can be read by a computer provided in a controller in an object measuring system for measuring the number of moving objects passing a boundary line, the program executing the steps of:

(a) extracting motion vectors at a plurality of times in each of a plurality of positions on said boundary line on the basis of a plurality of images;

(b) obtaining an integral value by integrating components perpendicular to said boundary line of said motion vectors; and (c) calculating the number of moving objects passing said boundary line on the basis of said integral value and a reference value regarding the integral value.

* * * * *